Sept. 1, 1970 W. J. KIEFER 3,526,299
AUTOMATIC LUBRICATOR
Filed Nov. 19, 1968 2 Sheets-Sheet 1

INVENTOR.
WILLIAM J. KIEFER
BY
Bernard J. Murphy
AGENT

Sept. 1, 1970  W. J. KIEFER  3,526,299
AUTOMATIC LUBRICATOR

Filed Nov. 19, 1968  2 Sheets-Sheet 2

INVENTOR
WILLIAM J. KIEFER
BY
Bernard J. Murphy
AGENT

United States Patent Office 3,526,299
Patented Sept. 1, 1970

3,526,299
AUTOMATIC LUBRICATOR
William J. Kiefer, Addison, N.Y., assignor to Ingersoll-Rand Company, New York, N.Y., a corporation of New Jersey
Filed Nov. 19, 1968, Ser. No. 776,912
Int. Cl. F16n 25/02
U.S. Cl. 184—7                            14 Claims

ABSTRACT OF THE DISCLOSURE

A lubricator having a first chamber therein for receiving pressured lubricant. The chamber has first and second compartments divided by a piston which is spring-loaded toward one end of the chamber. The piston responds to lubricant pressure in the first chamber to move against the spring to enlarge the first compartment. Associated valving moves in response to the piston movement, after subsequently overcoming a detent mechanism, to close a lubricant outlet port, and to admit lubricant to the second compartment. The pressured lubricant, on admittance to the second compartment, cooperates with the piston spring to return the piston to the port open, chamber-end position. The piston continuously and automatically reciprocates toward, and away from said position under the influences of constantly-supplied pressured lubricant, causing the valving cyclically to release pressure lubricant from the outlet port.

---

This invention pertains to lubricators, and in particular to a hydraulically-actuated and automatically pulsing or cycling lubricator having a cycling adjustment means.

Conventional, known lubricators are driven by the crankshaft of a prime mover, i.e., a compressor or engine, using gear reduction, or by use of a separate motor drive. The speed of these prior lubricators is set and cannot be changed without changing the noted gear reduction, or using expensive, variable-speed motors. Also, the cost of machining outer end bearing housings in the prime movers, to accommodate such lubricators, is excessive because of the machinery necessary for the gear reduction.

Therefore, it is an objective of my invention to teach a lubricator operative without motive power or drive from a prime mover or independent motor means.

Another object of my invention is to teach a lubricator which automatically "pulses" or cycles to expel lubricant therefrom repetitively.

Another object of my invention is to teach a lubricator which has means for varying the cycling frequency, in respect to time, at which lubricant is expelled therefrom.

Another object of my invention is to teach a lubricator having means responsive to given pressures of lubricant communicated thereto, to expel lubricant therefrom, via "snap-action" cycling to insure against the sluggish, hence inconsistent, responses which obtain in known, prior lubricators.

A feature of my invention comprises the provisioning of a step-piston arrangement in a lubricant-supplied chamber automatically operative of a lubricant valving mechanism which repetitively allows lubricant to be expelled from an outlet port.

Further objects and features of this invention will become more apparent by reference to the following description taken in conjunction with the accompanying figures in which.

Figure 1:
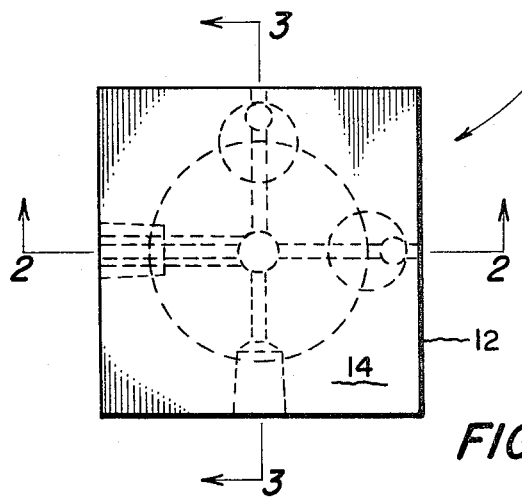
FIG. 1 is a plan view of the lubricator according to the invention.
Figure 2:
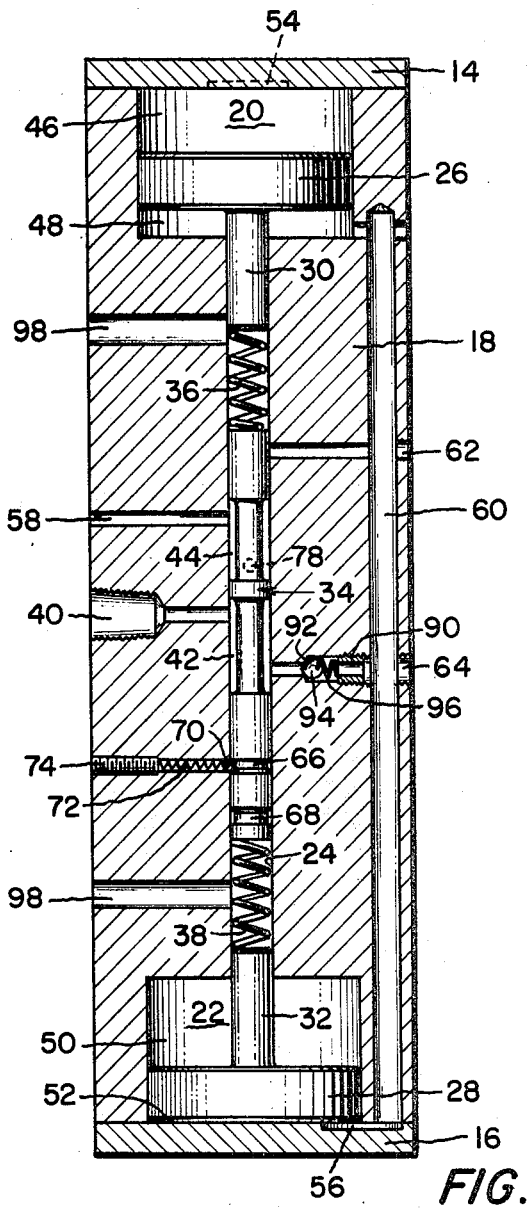
FIG. 2 is a longitudinal cross-section taken along section line 2—2 of FIG. 1, showing the valving plunger in one, "port-open" operative position.
Figure 3:
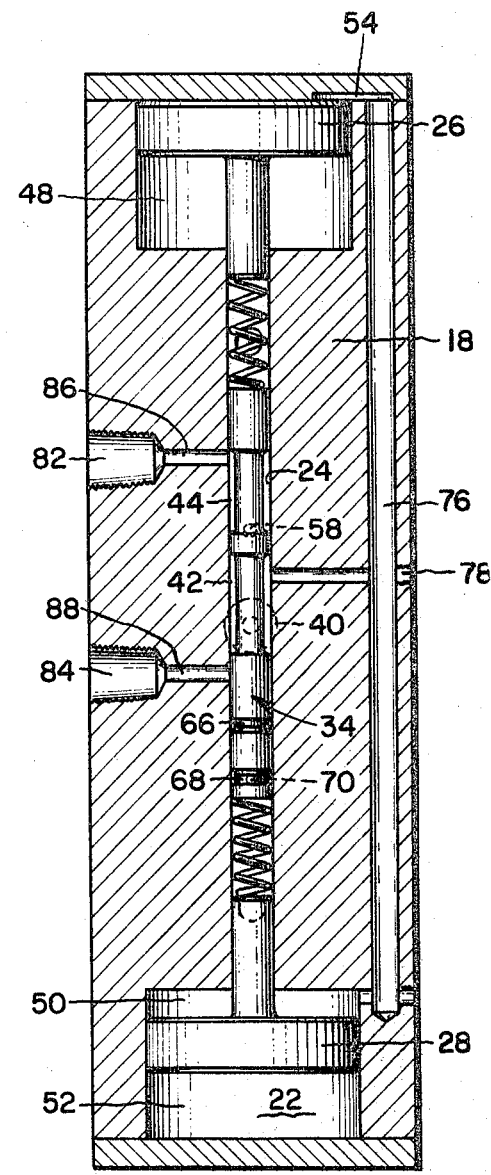
FIG. 3 is a longitudinal cross-section taken along section line 3—3 of FIG. 1, showing the valving plunger in another, "port-closed" operative position.
Figure 4:
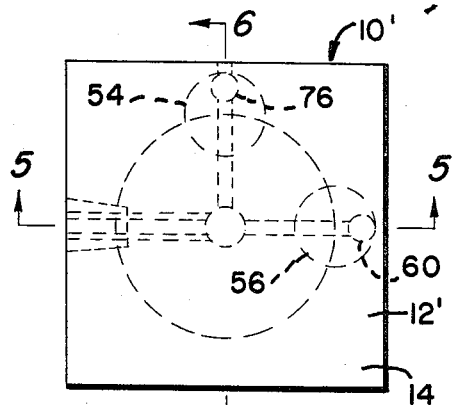
Figure 5:
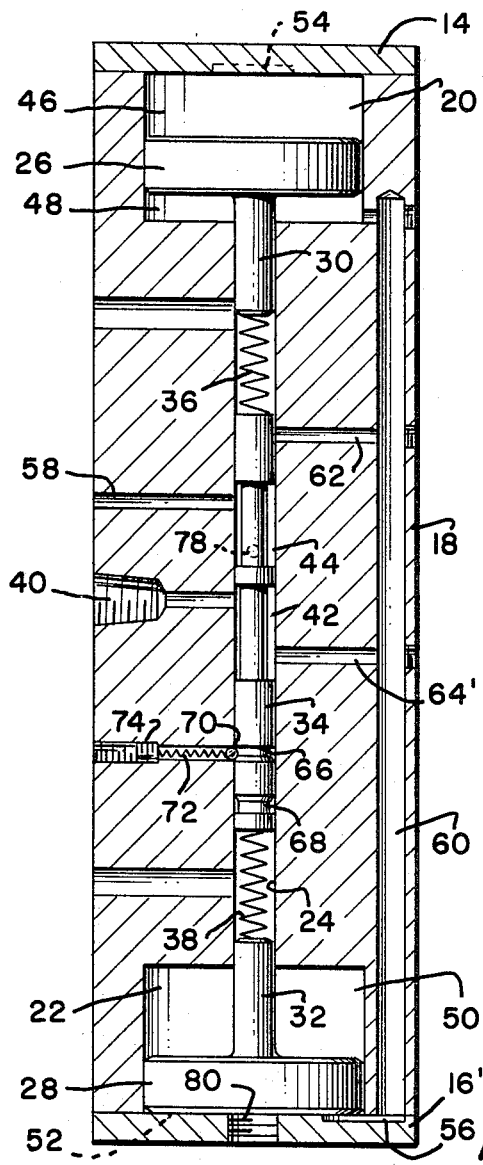
Figure 6:
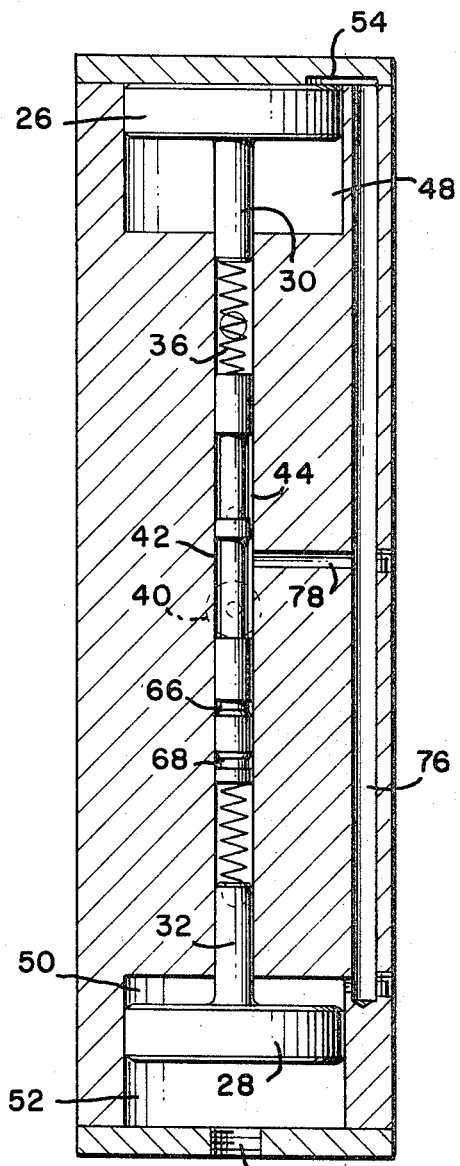

FIGS. 4, 5, and 6 illustrate an alternate embodiment of the invention and present plan views, and longitudinal cross-sections corresponding to those of FIGS. 1, 2, and 3.

As shown in FIG. 1 the lubricator 10, according to my invention, comprises a housing 12 which has covers at either ends thereof: a top end cover 14, and a bottom end cover 16 which latter is shown in FIG. 2. A housing body 18 (see FIG. 2) has formed therewithin an upper chamber 20 and a lower chamber 22. Centrally located, and axially extending therethorugh, is a passageway 24 in communication with said chambers. Upper and lower pistons 26 and 28, respectively, are disposed within the upper and lower chambers 20 and 22, respectively. Each piston carries therewith an extending piston rod 30 and 32 (respectively) which rods slidably project into the axially extending passageway 24.

Located midway along and within the passageway 24 is a valving plunger 34. Disposed against either ends of the plunger, and against rods 30 and 32, are upper and lower piston springs 36 and 38, respectively. Springs 36 and 38 are compression springs which urge both pistons 26 and 28 away from plunger 34.

A pressured lubricant inlet port 40 is formed midway in housing body 18 and communicates with passageway 24. Plunger 34 has formed thereabout extended, first and second annular recesses 42 and 44, and inlet port 40, as FIG. 2 shows, communicates with recess 42.

Chambers 20 and 22 are compartmented by the respective pistons, 26 and 28, therewithin. Accordingly, chamber 20 has a first compartment 46 and a second compartment 48 to either sides of the piston 26; chamber 22 has a first compartment 50 and a second compartment 52 on either sides of piston 28. I note a compartment 52 although—in FIG. 2— it it appears not to exist by virtue of the "bottoming" of piston 28 in chamber 22. Because piston 28 "bottoms" in chamber 22, I have provisioned cavities, in covers 14 and 16, which are contiguous with compartments 52 and 46. Cavities 54 and 56, which are provisioned for purposes more fully explained later, communicate with compartments 46 and 52, respectively; they comprise inlet means for the compartments 52 and 46 for the input of lubricant thereto. A vent passageway 58, formed in housing body 18, communicates with the second annular recess 44 of plunger 34. Passageway 58 is provided to offer a return-to-supply path for that lubricant supplied to the lubricator which is not expelled during a cycle of operation.

A first conduit 60 is formed in housing body 18, extends in parallel with passageway 24, and communicates cavity 56 with second compartment 48. First and second branching passageways 62 and 64, also formed in housing body 18, extend from the first conduit 60 and communicate with passageway 24. Passageways 62 and 64 are provided for communicating conduit 60, alternately, with annular recesses 44 and 42, for purposes made clear in the ensuing text. Further, valving plunger 34 has third and fourth annular recesses 66 and 68 which are provisioned for engagement with a detent mechanism to check the movement of the valve plunger. A detent ball 70 is constrained against a plunger 34, nesting in recess 66, by means of a detent spring 72. An adjusting screw 74 is positioned in the detent mechanism mounting bore for adjustment of the bias of spring 72.

By reference to FIG. 3 it can be seen that housing body 18 has a second axially extending conduit 76 formed therein. This conduit, however, communicates cavity 54 and first compartment 50 of chamber 22. A third branching passageway 78, formed in housing body 18, communicates between conduit 76 and passageway 24. More specifically, passageway 78 is provided for effecting communication, alternately, between conduit 76 and recesses 42 and 44.

Lubricator body 18 (FIG. 3) has a pair of ports 82 and 84 formed therein with passageways 86 and 88, respectively, extending therefrom in communication with the axially central passageway 24. Port 82 functions as the port via which lubricant is returned or vented from the mechanism being lubricated. Port 84 functions as the port via which lubricant is conducted to the to-be-lubricated mechanism. Ports 82 and 84 are connected externally with tubing (not shown) to form a common conduit to the point of application.

Finally, as shown in FIG. 2, second branching passageway 64 is internally threaded to receive a hollow, externally-threaded screw 90. The inner end of passageway 64 has a reduced diameter, the commencement of which forms a valve seat 92. Seat 92 nests a valving ball 94 thereon, and a compression spring 96 is biased against both the ball 94 and screw 90 causing the ball to seal passageway 64 at seat 92. This prohibits any flow communication between passageway 24 and first conduit 60, at least until lubricant pressure in first annular recess 42 is great enough to overcome the bias of spring 96 and unseat ball 94.

The two passageways 98, communicating with passageway 24, provide bleed vents for any leaked lubricant, and prevent the pressurization of any air between rods 32 and plunger 34. Compression of air in these areas would cause premature actuation of the plunger 34.

The simplistic operation of my lubricator, which belies its inventively novel construction, is (with initial reference to FIG. 2) as follows:

From a constant source of pressured lubricant, lubricant enters port 40. From port 40, the pressured lubricant flows into recess 42, and then passes out of port 84 to some external point of application (not shown). When the lubricant pressure in recess 42 rises to a level which can overcome the bias of spring 96, the lubricant unseats ball 94. Thus, ball 94 is removed from seat 92; the lubricant passes around ball 94 and flows through the hollow center of screw 90 and into conduit 60. Then, via conduit 60, the pressured lubricant proceeds to cavity 56, and second compartment 48 (of chamber 20). This puts lubricant pressure on the bottom sides of pistons 28 and 26.

It will be noted that the top sides of pistons 26 and 28 are vented through passageway 58 when plunger 34 is positioned as shown in FIG. 2. This venting proceeds via second conduit 76, third branching passageway 78, second annular recess 44, and then passageway 58. Responsive to the lubricant pressure thereunder pistons 28 and 26 rise. As piston 28 rises, it compresses spring 38. As this compression increases it reaches a value at which it overcomes the constraint on ball 70. Thereupon the valve plunger 34 moves upwardly until it reaches the position shown in FIG. 3 in which it cuts off the port 84 from the lubricant supplied via port 40. Note that, on reaching this elevated position, plunger 34 aligns fourth annular recess 68 with detent ball 70. Thus, plunger 34 "snaps" into and out of engagement with detent ball 70 at both recesses 66 and 68. At this time, the bottom sides of each of the pistons 28 and 26 are vented through passageway 58, via recess 44, first branching passageway 62, and conduit 60. This venting relieves the pressure on the bottom of the lubricator and allows the pistons 26 and 28 to drop, while at this same time, lubricant pressure is applied to the top of pistons 26 and 28. This is so because now inlet port 40, via recess 42, communicates with third branching passageway 78 and, by way of second conduit 76, with cavity 54 and first compartment 50 of chamber 22.

As the lubricant pressure above piston 26, in compartment 46, increases the compression of spring 36 is increased. As this compression builds up, it finally overcomes the restraint on ball 70, and the valve plunger 34 snaps back into the position shown in FIG. 2. The cycle is then repeated, again and again, as long as pressured lubricant is supplied to port 40. The frequency of cycles, over any given period of time, can be adjusted by metering the lubricant flow into port 40. Cycling frequency can also be varied by adjusting the restraint of the ball 70 by turning screw 74 further into or backing it out of the bore in which it is threaded.

This lubricator 10 of my invention employs the detent ball 70 and spring 72 to control the cycling frequency thereof. Further, it employs the valving ball 94 to control the pressure at which the cycle automatically will operate. By turning the hollow screw 90 further into passageway 64, the bias of spring 96 is increased, and a greater pressure in recess 42 is required to unseat ball 94. Conversely, by backing the screw 90 outwardly, a lesser pressure will unseat ball 94.

Most applications of my lubricator 10 will require this pressure control afforded by ball 94. Most often it will be necessary to insure a sufficient buildup of pressure in recess 42—and expelling of the lubricant therefrom out of port 84—before piston 28 "snaps" the plunger 34 into the "port-closed" position shown in FIG. 3. In some applications, however, this pressure control will be less critical. So for these less sensitive applications, a more simplified embodiment of my invention can be used. Such a simpler embodiment is shown in FIGS. 4, 5, and 6 where index numbers which are the same as, or similar to those in FIGS. 1, 2, and 3, denote same or similar parts and components.

The lubricator 10' embodiment of FIGS. 4, 5, and 6 comprises a housing 12' having a top end cover 14, bottom end cover 16', and a housing body 18' therebetween. The signifiance differences between this embodiment, and that of the preferred embodiment priorly disclosed, is in the omission of the lubricant-pressure check valving. A passageway 64' (corresponding to passageway 64, FIG. 2) directly communicates conduit 60 with axial passageway 24 without check valving therewithin. Also, ports 82 and 84, and passageway 86 and 88 (FIG. 3) have been dispensed with; instead, now a lubricant outlet port 80 is presented in bottom end cover 16. Port 80 opens on compartment 52 to expel lubricant from said compartment automatically and cyclically.

Operation of the lubricator 10' is largely similar to that of lubricator 10. A constant supply of pressured lubricant admitted via inlet port 40 passes into recess 42, passageway 64', conduit 60, and cavity 56. When the pressure of lubricant is sufficiently built up, it moves piston 28 (and piston 26) upwardly. Upward movement of piston 28 exposes port 80 and pressured lubricant issues from compartment 52, through port 80, to the point of application (not shown).

Subsequent "snap-action" movement of plunger 34 to the positioning shown in FIG. 6 occurs in the same manner as explained priorly in connection with the embodiment of FIGS. 1, 2, and 3. And the return of the plunger 34 and pistons 26 and 28 to the positioning shown in FIG. 5 also occurs in the same manner as does the embodiment of FIGS. 1, 2, and 3. The alternate embodiment of FIGS. 4, 5, and 6 simply is lacking a pressure-responsive control like that of the check valving components 90, 92, 94, and 96 (FIG. 2) of the preferred embodiment.

Prior lubricators operate with luubricant flows having to negotiate small orifices that plug easily. The lubricator of my invention has no orifices; rather, lubricant is conducted through passageways and conduits having considerable inside diameters which obviate the possibility of plugging.

Also, those skilled in this art will readily recognize that the pressures on all parts induced by the springs 36 and 38 are low and therefore all parts will have a long-working life. More, the movement of all parts is limited—in the embodiments illustrated, movement is limited to ¾ inch or less—and all parts are well lubricated. This also contributes to a long-working life, a low parts mortality.

Therefore, while I have described my invention in connection with specific embodiments thereof, it is to be clearly understood that this is done only by way of example and not as a limitation to the scope of my invention as set forth in the objects thereof and in the accompanying claims.

I claim:
1. An automatic lubricator, comprising:
a housing;
means defining at least a first chamber in said housing for receiving lubricant therein;
said housing having outlet means for expelling lubricant therefrom;
said chamber having a plurality of inlet means for receiving pressured lubricant from a source thereof; and
valving means interposed between said inlet and outlet means, automatically responsive to a predetermined lubricant pressure in said first chamber repetitively to open and close off at least one inlet means from such source;
said valving means comprising means movable within said chamber which compartments said first chamber, each compartment of said first chamber having one of said inlet means in communication therewith, and means for checking said compartmenting means against movement; and wherein
said chamber defining means further defines a second chamber in said housing;
said second chamber having a number of inlet means for receiving pressured lubricant from said source; and
said valving means further is interposed between said inlet means of said number thereof, to prevent lubricant flow communication therebetween.

2. A lubricator, according to claim 1, wherein:
said compartmenting means has surfaces which cooperate with surfaces of said first chamber to close off one of said inlet means, as a consequence of movement of said compartmenting means in one direction.

3. A lubricator, according to claim 1, wherein:
said valving means comprises means for urging said compartmenting means in said one direction.

4. A lubricator, according to claim 1, wherein:
said checking means include means for restraining said compartmenting means against movement from a plurality of positions.

5. A lubricator, according to claim 1, wherein:
said checking means comprises detent means.

6. A lubricator, according to claim 5, wherein:
said detent means has means for adjusting the detention action thereof.

7. A lubricator, according to claim 1, further including:
means displaceable within said second chamber which compartments said second chamber; and wherein each compartment of said second chamber has one inlet means of said number thereof in communication therewith.

8. A lubricator, according to claim 1, further comprising:
conduitry through communicating said first and second chambers.

9. A lubricator, according to claim 1 further comprising:
conduitry through communicating one of said compartments of said first chamber with one of said compartments of said second chamber, and another of said compartments of said first chamber with another of said compartments of said second chamber.

10. A lubricator, according to claim 7, wherein:
said first chamber comprises a piston chamber; and
said valving means include a piston movable within said chamber, means normally urging said piston in one given direction, and a movable plunger interposed between said source and said inlet means;
said plunger having means cooperative with said housing and operative coincident with plunger movement, for alternately throughconnecting said source and one of said compartments while closing off another of said compartments from said source, and vice versa.

11. A lubricator, according to claim 1, wherein:
said outlet means opens on said first chamber.

12. A lubricator, according to claim 1, further comprising:
means disposed between said source and said chamber for controlling the pressure-responsiveness of said valving means.

13. A lubricator, according to claim 12, wherein:
said controlling means is adjustable.

14. An automatic lubricator, comprising:
a housing;
means defining at least a first chamber in said housing for receiving lubricant therein;
said housing having outlet means for expelling lubricant therefrom;
said chamber having a plurality of inlet means for receiving pressured lubricant from a source thereof; and
valving means interposed between said inlet and outlet means, automatically responsive to a predetermined lubricant pressure in said first chamber repetitively to open and close off at least one inlet means from such source;
said valving means comprising means movable within said chamber which compartments said first chamber, each conpartment of said first chamber having one of said inlet means in communication therewith, and means for checking said compartmenting means against movement; and wherein
said valving means comprises a plunger interposed between said source and said chamber, said plunger being movable and having means operative in cooperation with said housing and coincident with plunger movement for alternately through communicating said source and one of said compartments while closing off another of said compartments from said source, and vice versa.

References Cited

UNITED STATES PATENTS

| 2,266,204 | 12/1941 | Hull | 184—7 |
| 2,300,330 | 10/1942 | Acker | 184—7 |
| 3,330,380 | 7/1967 | Fujita | 184—7 |

FOREIGN PATENTS

| 309,293 | 11/1955 | Switzerland. |
| 359,936 | 3/1962 | Switzerland. |

MANUEL A. ANTONAKAS, Primary Examiner

U.S. Cl. X.R.

184—39